US010185140B2

(12) United States Patent
Shibayama et al.

(10) Patent No.: US 10,185,140 B2
(45) Date of Patent: Jan. 22, 2019

(54) FABRY-PEROT INTERFERENCE FILTER

(71) Applicant: HAMAMATSU PHOTONICS K.K., Hamamatsu-shi, Shizuoka (JP)

(72) Inventors: Katsumi Shibayama, Hamamatsu (JP); Takashi Kasahara, Hamamatsu (JP); Masaki Hirose, Hamamatsu (JP); Toshimitsu Kawai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/901,732

(22) PCT Filed: Jun. 24, 2014

(86) PCT No.: PCT/JP2014/066662
§ 371 (c)(1),
(2) Date: Dec. 29, 2015

(87) PCT Pub. No.: WO2015/002021
PCT Pub. Date: Jan. 8, 2015

(65) Prior Publication Data
US 2016/0370573 A1    Dec. 22, 2016

(30) Foreign Application Priority Data
Jul. 2, 2013  (JP) ................................ 2013-138867

(51) Int. Cl.
*G01J 3/26* (2006.01)
*G02B 26/00* (2006.01)

(52) U.S. Cl.
CPC .............. *G02B 26/001* (2013.01); *G01J 3/26* (2013.01)

(58) Field of Classification Search
CPC ...... G02B 6/29358; G02B 26/001; G01J 3/26
See application file for complete search history.

(56) References Cited

U.S. PATENT DOCUMENTS

2007/0171531 A1*  7/2007  Nakamura ........... G02B 26/001
                                                            359/580
2011/0279824 A1* 11/2011  Blomberg ............ G02B 26/001
                                                            356/519
(Continued)

FOREIGN PATENT DOCUMENTS

CN        1651966       8/2005
EP        0 668 490     8/1995
(Continued)

OTHER PUBLICATIONS

English-language translation of International Preliminary Report on Patentability (IPRP) dated Jan. 14, 2016 that issued in WO Patent Application No. PCT/JP2014/066662.
(Continued)

*Primary Examiner* — Kimberly N. Kakalec
(74) *Attorney, Agent, or Firm* — Drinker Biddle & Reath LLP

(57) ABSTRACT

A Fabry-Perot interference filter 10A includes a first mirror 31; a second mirror 41 being opposite to the first mirror 31 with a gap S therebetween; a first electrode 17 formed in the first mirror 31 to surround a light transmission region 11; a second electrode 18 formed in the first mirror 31 to include the light transmission region 11; and a third electrode 19 formed in the second mirror 41 to be opposite to the first electrode 17 and the second electrode 18 and connected to the same potential as the second electrode 18. The second electrode 18 is positioned at the side of the third electrode 19 or the opposite side thereof with respect to the first electrode 17 in an opposite direction D where the first mirror 31 and the second mirror 41 are opposite each other.

7 Claims, 7 Drawing Sheets

(56) References Cited

U.S. PATENT DOCUMENTS

2012/0050751 A1* 3/2012 Blomberg ............ B81B 3/0013
356/519
2012/0181647 A1 7/2012 Blomberg

FOREIGN PATENT DOCUMENTS

| JP | H07-286809 A | 10/1995 |
| JP | 2012-022328 A | 2/2012 |
| JP | 2012-155023 A | 8/2012 |
| JP | 2012-220765 | 11/2012 |
| JP | 2012-528345 | 11/2012 |
| WO | WO 2013/051372 | 4/2013 |

OTHER PUBLICATIONS

B. Du Bois et al., "HF Etching of Si-Oxides and Si-Nitrides for Surface Micromachining", Sensor Technology 2001, Proceedings of the Sensor Technology Conference 2001, Held in Enschede, The Netherlands, May 14-15, 2001, p. 131-p. 136.

* cited by examiner

FABRY-PEROT INTERFERENCE FILTER

TECHNICAL FIELD

The present invention relates to a Fabry-Perot interference filter.

BACKGROUND ART

As a Fabry-Perot interference filter according to the related art, described in Patent Literature 1 is one including a first mirror, a second mirror facing the first mirror with a gap therebetween, a first electrode formed in the first mirror to surround a light transmission region, a second electrode formed in the first mirror to include the light transmission region, and a third electrode formed in the second mirror to be opposite to the first electrode and the second electrode and electrically connected to the second electrode.

In the Fabry-Perot interference filter, when a voltage is applied between the first electrode and the third electrode, electrostatic force according to the voltage is generated between both the electrodes, so that a distance between the first mirror and the second mirror can be adjusted. Because a wavelength of light transmitting the Fabry-Perot interference filter depends on the distance between both the mirrors in the light transmission region, the wavelength of the transmitting light can be appropriately selected by adjusting the voltage applied between the first electrode and the third electrode. At this time, because the second electrode has the same potential as the third electrode electrically connected to the second electrode, the second electrode functions as a compensation electrode to keep the first mirror and the second mirror flat in the light transmission region.

CITATION LIST

Patent Literature

Patent Literature 1: Japanese Patent Application Laid-Open Publication No. 7-286809

SUMMARY OF INVENTION

Technical Problem

However, in the Fabry-Perot interference filter described in Patent Literature 1, because the first electrode and the second electrode are disposed on the same plane in the first mirror, electric insulation between both the electrodes may not be sufficiently secured. As such, if the electric insulation between the first electrode and the second electrode is insufficient, a leak current occurs, the distance between the first mirror and the second mirror cannot be adjusted appropriately according to the voltage, and light having a desired wavelength cannot be transmitted.

Accordingly, an object of the present invention is to provide a Fabry-Perot interference filter capable of appropriately transmitting light having a desired wavelength.

Solution to Problem

A Fabry-Perot interference filter according to an aspect of the present invention includes: a first mirror; a second mirror being opposite to the first mirror with a gap therebetween; a first electrode formed in the first mirror to surround a light transmission region; a second electrode formed in the first mirror to include the light transmission region; and a third electrode formed in the second mirror to be opposite to the first electrode and the second electrode and connected to the same potential as the second electrode. The second electrode is positioned at the side of the third electrode or the opposite side thereof with respect to the first electrode in an opposite direction where the first mirror and the second mirror are opposite each other.

In the Fabry-Perot interference filter, because the first electrode and the second electrode are not disposed on the same plane in the same mirror, electric insulation between the first electrode and the second electrode is sufficiently secured. Therefore, according to the Fabry-Perot interference filter, light having a desired wavelength can be transmitted appropriately.

In the Fabry-Perot interference filter according to the aspect of the present invention, the second electrode may be positioned at the opposite side of the third electrode with respect to the first electrode in the opposite direction. According to this configuration, because the second electrode functioning as a compensation electrode to keep the first mirror and the second mirror flat in the light transmission region is not positioned between the first electrode and the third electrode, electrostatic force according to a voltage can be generated appropriately between the first electrode and the third electrode.

In the Fabry-Perot interference filter according to the aspect of the present invention, the second electrode may be isolated from the gap by a dielectric layer configuring the first mirror. According to this configuration, a potential difference is generated between the dielectric layer surrounded by the first electrode, and the third electrode, and the electrostatic force is generated. Therefore, it is possible to decrease a voltage applied between the first electrode and the third electrode to adjust a distance between the first mirror and the second mirror.

In the Fabry-Perot interference filter according to the aspect of the present invention, the second electrode may be exposed to the gap in a recessed portion provided in the first mirror. According to this configuration, it is possible to secure electric insulation between the first electrode and the second electrode more surely and it is possible to cause the second electrode to function as the compensation electrode more surely.

The Fabry-Perot interference filter according to the aspect of the present invention may further include a wiring electrically connecting the second electrode and the third electrode. The wiring may have a first wiring portion extending from the second electrode to the outside of the second electrode along a direction vertical to the opposite direction and a second wiring portion extending from the first wiring portion to the side of the third electrode along the opposite direction. According to this configuration, the laying of the wiring can be simplified such that a wiring portion extending from the second electrode to the opposite side of the third electrode along the opposite direction is unnecessary in the wiring to electrically connect the second electrode and the third electrode. Therefore, a risk of defect occurrence at the time of manufacturing and failure occurrence at the time of use can be reduced.

The Fabry-Perot interference filter according to the aspect of the present invention may further include a substrate supporting the first mirror and the second mirror. The first mirror may be disposed on one side of the substrate and the second mirror may be disposed on the one side of the first mirror with the gap therebetween. In this configuration, the first mirror is fixed on the substrate and the second mirror is driven. Here, the first electrode and the second electrode are formed in the first mirror, but only the third electrode is formed in the second mirror. For this reason, in the second mirror, irregular stress is hard to occur, as compared with the first mirror. According to this configuration, because the second mirror in which the irregular stress is hard to occur is driven, a distance between the first mirror and the second mirror can be adjusted appropriately.

In the Fabry-Perot interference filter according to the aspect of the present invention, each of the first mirror and the second mirror may have a polysilicon layer and a silicon nitride layer and the first electrode, the second electrode, and the third electrode may be doped regions of impurities in the polysilicon layer. For example, even when the gap between the first mirror and the second mirror is formed by etching a sacrificial layer made of silicon oxide, according to this configuration, it is possible to prevent that the first mirror and the second mirror are etched at the same time and are degraded by etching of the sacrificial layer. Because an optical property of the polysilicon layer is rarely affected by execution or non-execution of doping of the impurities, the electrode can be suppressed from obstructing a function of the mirror.

In the Fabry-Perot interference filter according to the aspect of the present invention, the polysilicon layer may be a layer of amorphous silicon polycrystallized by annealing. According to this configuration, because stress occurring in the mirror at the time of manufacturing can be easily adjusted, the mirror can be suppressed from being damaged by driving.

Advantageous Effects of Invention

According to the present invention, a Fabry-Perot interference filter capable of appropriately transmitting light having a desired wavelength can be provided.

DESCRIPTION OF EMBODIMENTS

Figure 1:
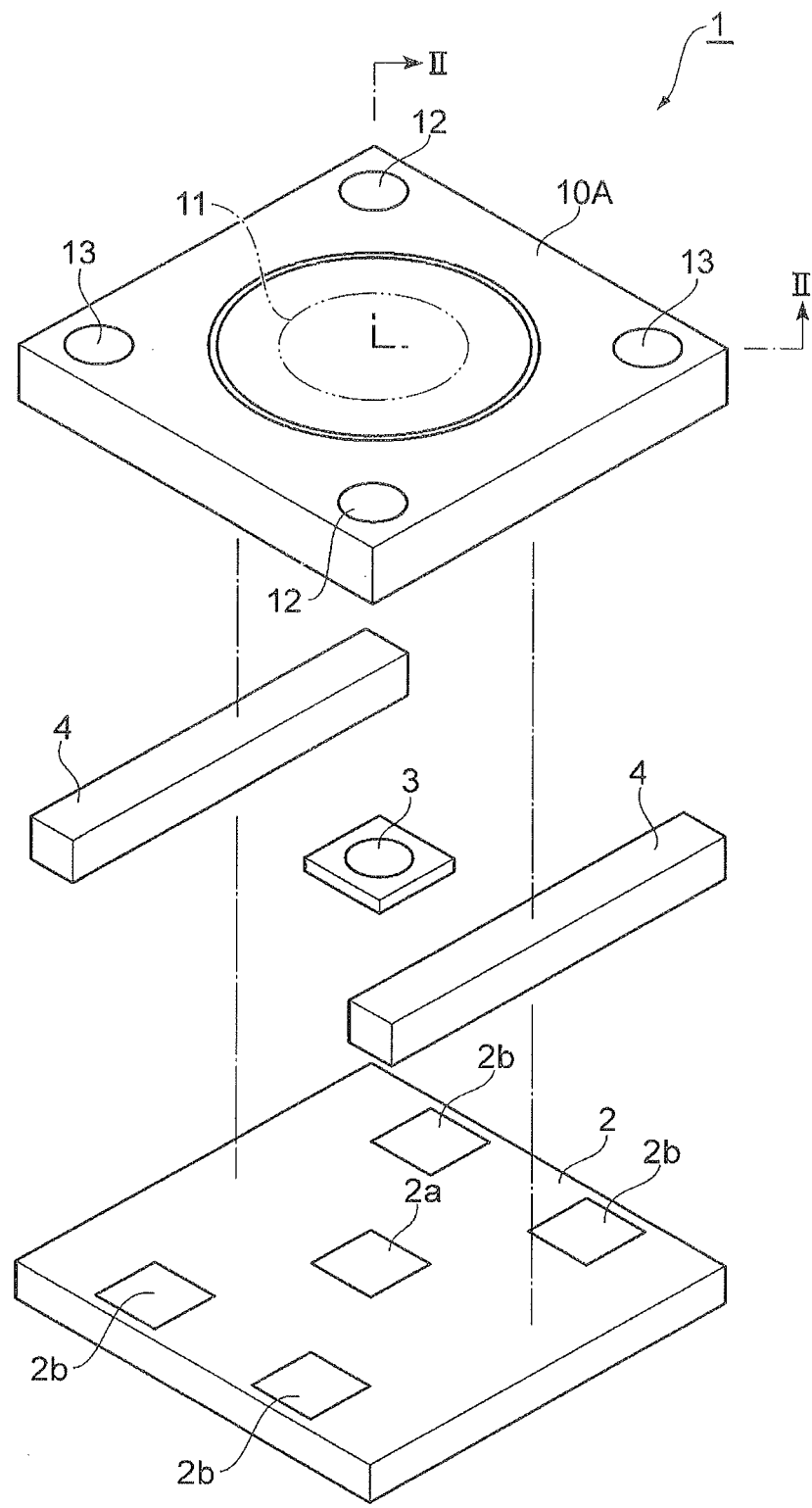
FIG. 1 is an exploded perspective view of a spectroscopic sensor to which a Fabry-Perot interference filter according to a first embodiment of the present invention is applied.

Hereinafter, preferred embodiments of the present invention will be described in detail with reference to the drawings. In all the drawings, the same or equivalent portions are denoted with the same reference numerals and overlapped description is omitted.

First Embodiment

Spectroscopic Sensor

As illustrated in FIG. 1, a spectroscopic sensor 1 includes a wiring substrate 2, a light detector 3, a plurality of spacers 4, and a Fabry-Perot interference filter 10A. The wiring substrate 2 is provided with a mounting portion 2a on which the light detector 3 is mounted and a plurality of electrode pads 2b. One of the electrode pads 2b is electrically connected to the mounting portion 2a. The other of the electrode pads 2b is electrically connected to a thermistor or the like disposed on the wiring substrate 2 and is used to electrically connect the thermistor or the like to the outside of the spectroscopic sensor 1. The light detector 3 is an infrared detector, for example. More specifically, the light detector 3 is a quantum-type sensor using InGaAs or a thermal sensor using a thermopile or a bolometer.

The plurality of spacers 4 are fixed on the wiring substrate 2 and the Fabry-Perot interference filter 10A is fixed on the plurality of spacers 4. Here, each of the plurality of spacers 4 and the Fabry-Perot interference filter 10A is preferably fixed by a flexible resin material to suppress an influence of thermal stress on the Fabry-Perot interference filter 10A. In addition, the resin material is preferably selected from room temperature-curing resin materials or low temperature-curing resin materials. The plurality of spacers 4 are preferably formed of a material having a thermal expansion coefficient equal to a thermal expansion coefficient of a substrate 14 configuring the Fabry-Perot interference filter 10A, such as quartz and silicon, or a material having a thermal expansion coefficient smaller than the thermal expansion coefficient of the substrate 14, to alleviate a thermal expansion coefficient difference with portions contacting the plurality of spacers 4 particularly in the Fabry-Perot interference filter 10A. Instead of the configuration in which the wiring substrate 2 and the spacers 4 are formed as separate bodies as described above, portions becoming the spacers 4 may be integrally formed on a surface of the wiring substrate 2. The light detector 3 is opposite to a light transmission region 11 of the Fabry-Perot interference filter 10A between the wiring substrate 2 and the Fabry-Perot interference filter 10A and detects light having transmitted the Fabry-Perot interference filter 10A. A temperature sensor such as the thermistor may be disposed on the wiring substrate 2.

Although not illustrated in the drawings, the wiring substrate 2, the light detector 3, the plurality of spacers 4, and the Fabry-Perot interference filter 10A are accommodated in a CAN package, in a state in which the wiring substrate 2 is fixed on a stem and the light transmission region of the Fabry-Perot interference filter 10A is opposite to a light transmission window of the cap. The electrode pads 2b of the wiring substrate 2 and terminals 12 and 13 of the Fabry-Perot interference filter 10A are electrically connected to each of lead pins penetrating the stem by wire bonding. An input/output of an electric signal with respect to the light detector 3, and the like, are executed via the lead pins, the electrode pads 2b, and the mounting portion 2a. A voltage is applied to the Fabry-Perot interference filter 10A via the lead pins and the terminals 12 and 13.

In the spectroscopic sensor 1 configured as described above, when measurement light is incident, light having a predetermined wavelength transmits the Fabry-Perot interference filter 10A, according to the voltage applied to the Fabry-Perot interference filter 10A. In addition, the light having transmitted the Fabry-Perot interference filter 10A is detected by the light detector 3. In the spectroscopic sensor 1, the light having transmitted the Fabry-Perot interference filter 10A is detected by the light detector 3 while the voltage applied to the Fabry-Perot interference filter 10A is changed, so that a spectral spectrum can be obtained.

[Fabry-Perot Interference Filter]

Figure 2:
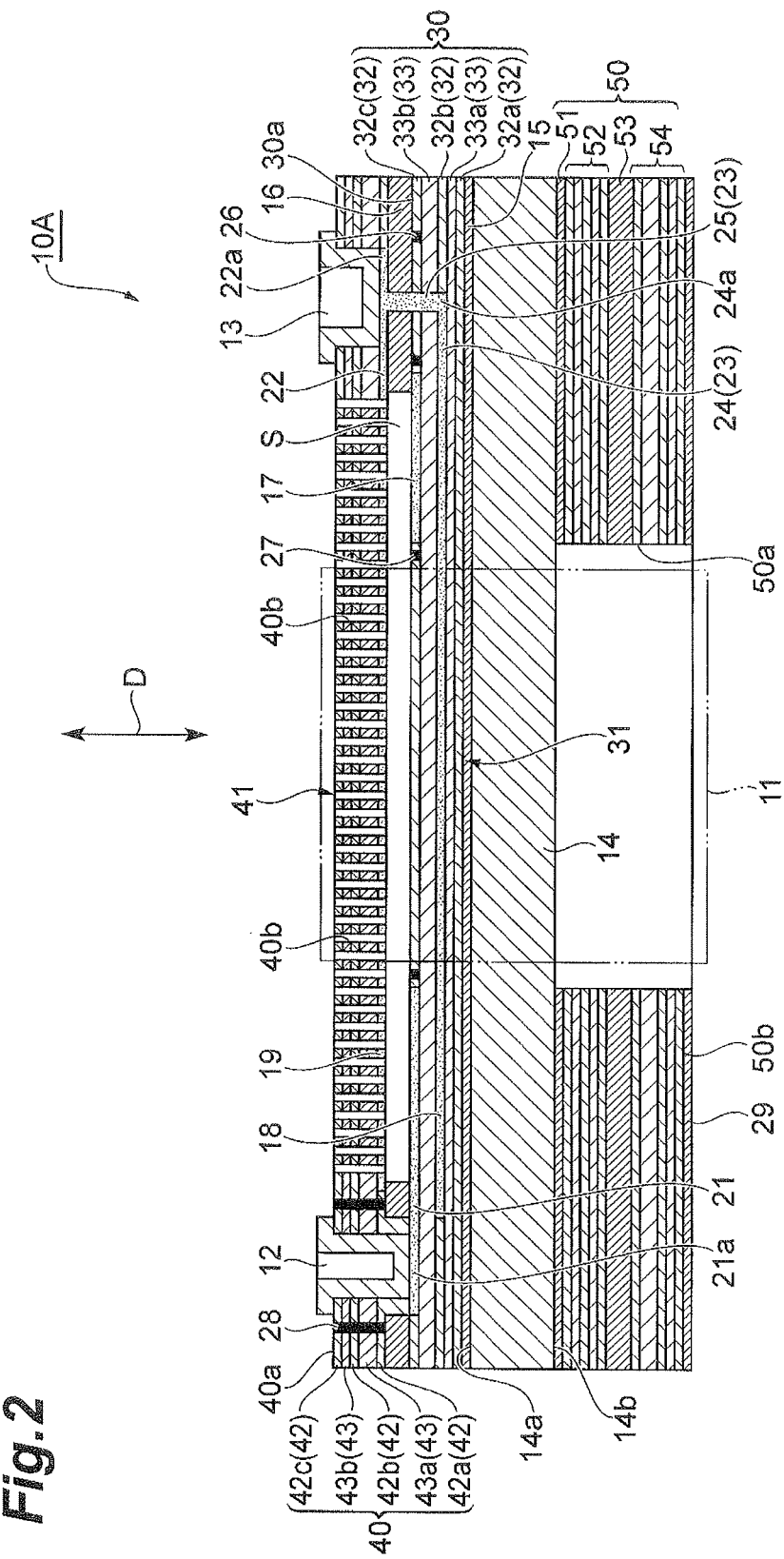
FIG. 2 is a cross-sectional view of the Fabry-Perot interference filter taken along the line II-II of FIG. 1.

As illustrated in FIG. 2, the Fabry-Perot interference filter 10A includes a substrate 14. A reflection prevention layer 15, a first laminate 30, a sacrificial layer 16, and a second laminate 40 are laminated in this order on a surface 14a of a light incidence side of the substrate 14. A gap (air gap) S is formed between the first laminate 30 and the second laminate 40 by the sacrificial layer 16 of a frame shape. In the Fabry-Perot interference filter 10A, the measurement light is incident on the second laminate 40 from the opposite side of the substrate 14 and the light having the predetermined wavelength transmits the light transmission region 11 defined in a center portion of the Fabry-Perot interference filter 10A. The substrate 14 is made of silicon, glass, or the like, for example, and the reflection prevention layer 15 and the sacrificial layer 16 are made of silicon oxide, for example. A thickness of the sacrificial layer 16 is 200 nm to 10 μm, for example. The thickness of the sacrificial layer 16 is preferably the integral multiple of ½ of a center transmission wavelength (wavelength to be a center of a variable range of a transmission wavelength of the Fabry-Perot interference filter 10A).

A portion corresponding to the light transmission region 11 in the first laminate 30 functions as the first mirror 31. The first laminate 30 is configured by laminating a plurality of polysilicon layers 32 and a plurality of silicon nitride layers 33 alternately. In this embodiment, a polysilicon layer 32a, a silicon nitride layer 33a, a polysilicon layer 32b, a silicon nitride layer 33b, and a polysilicon layer 32c are laminated in this order on the reflection prevention layer 15. The polysilicon layer 32 is formed by polycrystallizing amorphous silicon by annealing. As such, the first mirror 31 has the polysilicon layer 32 and the silicon nitride layer 33. A thickness of each of the layers 32 and 33 is 50 nm to 2 μm, for example. In this embodiment, the thickness of the polysilicon layer 32 is 130 nm, for example, and the thickness of the silicon nitride layer 33 is 200 nm, for example. An optical thickness of each of the polysilicon layer 32 and the silicon nitride layer 33 configuring the first mirror 31 is preferably the integral multiple of ¼ of the center transmission wavelength (center wavelength of the variable wavelength range). In addition, the polysilicon layer 32 may be formed by forming a film of polysilicon directly.

A portion corresponding to the light transmission region 11 in the second laminate functions as the second mirror 41 being opposite to the first mirror 31 with the gap S therebetween. Similar to the first laminate 30, the second laminate 40 is configured by laminating a plurality of polysilicon layers 42 and a plurality of silicon nitride layers 43 alternately. In this embodiment, a polysilicon layer 42a, a silicon nitride layer 43a, a polysilicon layer 42b, a silicon nitride layer 43b, and a polysilicon layer 42c are laminated in this order on the sacrificial layer 16. The polysilicon layer 42 is formed by polycrystallizing amorphous silicon by annealing. As such, the second mirror 41 has the polysilicon layer 42 and the silicon nitride layer 43. A thickness of each of the layers 42 and 43 is 50 nm to 2 μm, for example. In this embodiment, the thickness of the polysilicon layer 42 is 130 nm, for example, and the thickness of the silicon nitride layer 43 is 200 nm, for example. An optical thickness of each of the polysilicon layer 42 and the silicon nitride layer 43 configuring the second mirror 41 is preferably the integral multiple of ¼ of the center transmission wavelength (center wavelength of the variable wavelength range). In addition, the polysilicon layer 42 may be formed by forming a film of polysilicon directly.

A plurality of through-holes 40b extending from the surface 40a of the second laminate 40 to the gap S are distributed uniformly in a portion corresponding to the gap S in the second laminate 40. The through-holes 40b are formed not to substantially affect a function of the second mirror 41. A diameter of the through-hole 40b is 100 nm to 5 μm, for example, and an opening area of the through-hole 40b occupies 0.01 to 10% of an area of the second mirror 41, for example.

In the Fabry-Perot interference filter 10A, the first mirror 31 and the second mirror 41 are supported by the substrate 14. In addition, the first mirror 31 is disposed on a light incidence side (one side) of the substrate 14 and the second mirror 41 is disposed on a light incidence side (one side) of the first mirror 31 with the gap S therebetween.

Figure 3:
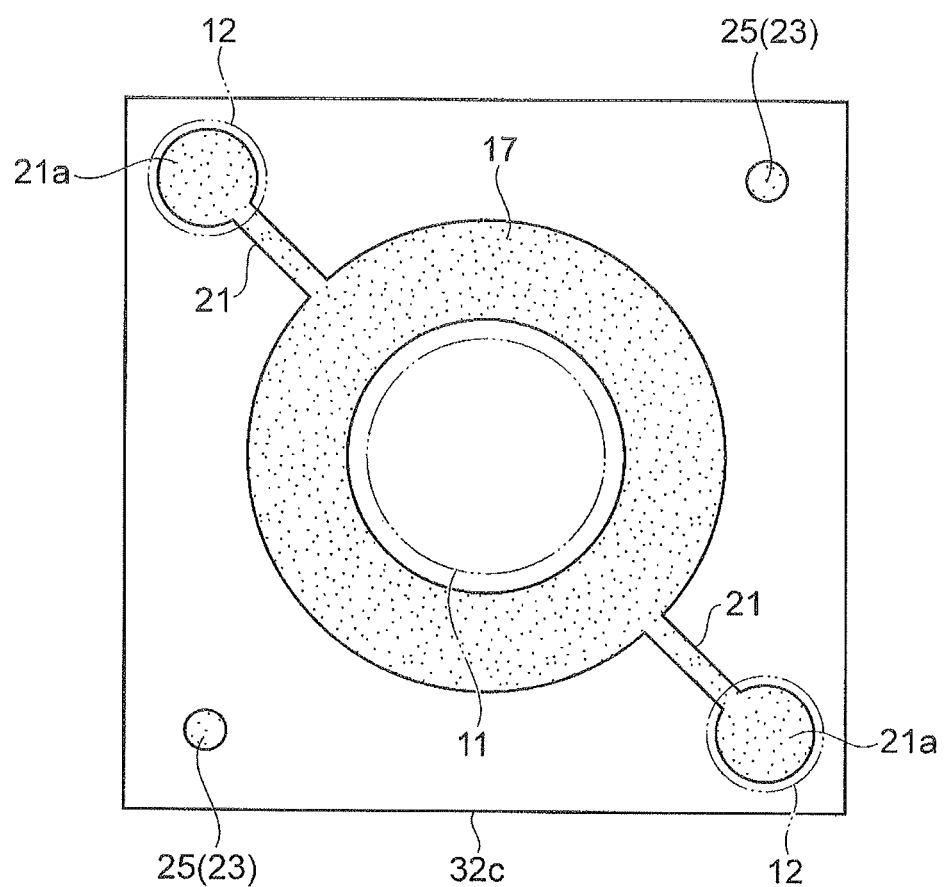
FIG. 3 is a plan view of a polysilicon layer provided with a first electrode.

As illustrated in FIGS. 2 and 3, a first electrode 17 is formed in the first mirror 31 to surround the light transmission region 11. More specifically, the first electrode 17 is formed by doping impurities into the polysilicon layer 32c and decreasing resistance. That is, the first electrode 17 is a doped region of the impurities in the polysilicon layer 32c and is exposed to the gap S. It is preferable that an inner edge portion of the first electrode 17 be not overlapped to an outer edge portion of the light transmission region 11.

Figure 4:
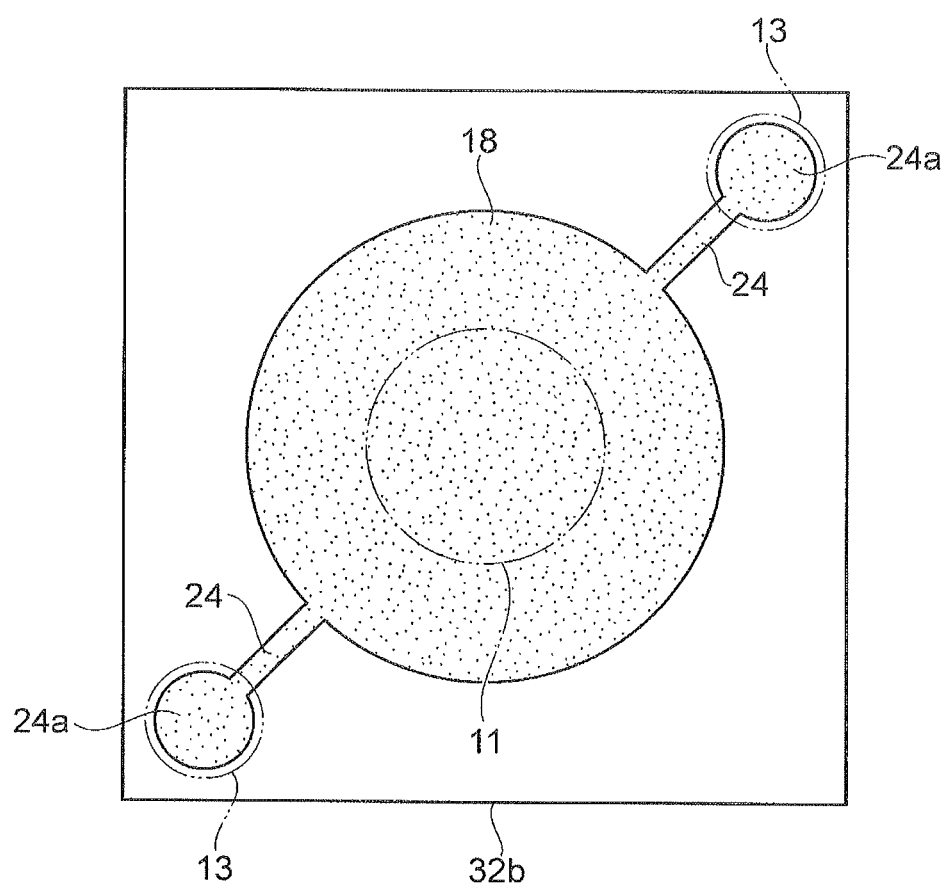
FIG. 4 is a plan view of a polysilicon layer provided with a second electrode.

As illustrated in FIGS. 2 and 4, a second electrode 18 is formed in the first mirror 31 to include the light transmission region 11. More specifically, the second electrode 18 is formed by doping the impurities into the polysilicon layer 32b and decreasing resistance. That is, the second electrode 18 is a doped region of the impurities in the polysilicon layer 32b and is isolated from the gap S by the silicon nitride layer 33b and the polysilicon layer 32c (that is, a dielectric layer configuring the first mirror 31). In the polysilicon layer 32b, a size of the second electrode 18 is preferably a size including an entire region of the light transmission region 11 and may be approximately equal to a size of the light transmission region 11.

Figure 5:
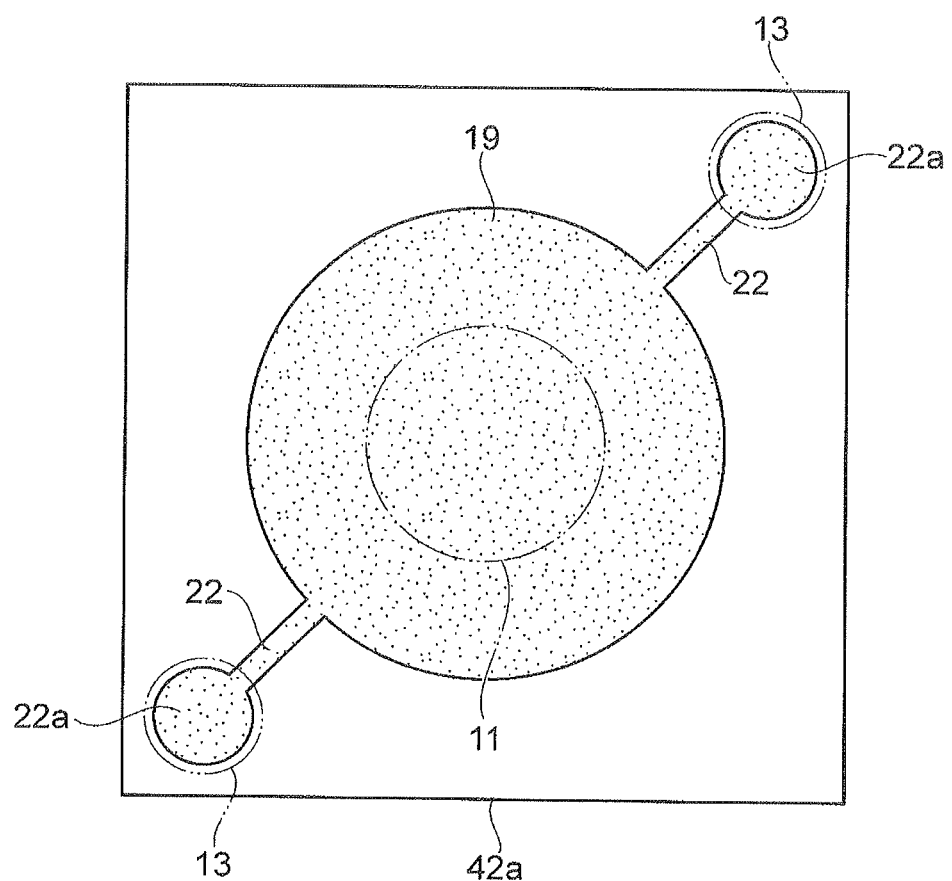
FIG. 5 is a plan view of a polysilicon layer provided with a third electrode.

As illustrated in FIGS. 2 and 5, a third electrode 19 is formed in the second mirror 41 to be opposite to the first electrode 17 and the second electrode 18. More specifically, the third electrode 19 is formed by doping the impurities into the polysilicon layer 42a and decreasing resistance. That is, the third electrode 19 is a doped region of the impurities in the polysilicon layer 42a and is exposed to the gap S.

In the Fabry-Perot interference filter 10A, the second electrode 18 is positioned at the opposite side of the third electrode 19 with respect to the first electrode 17 in an opposite direction D where the first mirror 31 and the second mirror 41 are opposite each other. That is, the first electrode 17 and the second electrode 18 are not disposed on the same plane in the first mirror 31 and the second electrode 18 is separated from the third electrode 19 more than the first electrode 17.

As illustrated in FIGS. 1 and 2, a pair of terminals 12 to apply a voltage to the Fabry-Perot interference filter 10A is provided to be opposite each other with the light transmission region 11 therebetween. Each terminal 12 is disposed in the through-hole extending from the surface 40a of the second laminate 40 (that is, the surface of the polysilicon layer 42c of the second laminate 40) to the polysilicon layer 32c of the first laminate 30 and is electrically connected to the first electrode 17.

More specifically, as illustrated in FIG. 3, each terminal 12 is connected to an end portion 21a of a wiring 21 extending from the first electrode 17 to a portion below each terminal 12 along a direction vertical to the opposite direction D and thereby electrically connected to the first electrode 17. Each wiring 21 is integrally formed with the first electrode 17 by doping the impurities into the polysilicon layer 32c and decreasing resistance.

As illustrated in FIGS. 1 and 2, a pair of terminals 13 to apply a voltage to the Fabry-Perot interference filter 10A is provided to be opposite each other with the light transmission region 11 therebetween. An opposite direction of the pair of terminals 12 and an opposite direction of the pair of terminals 13 are orthogonal to each other. Each terminal 13 is disposed in the through-hole extending from the surface 40a of the second laminate 40 to the polysilicon layer 42a of the second laminate 40 and is electrically connected to the third electrode 19.

More specifically, as illustrated in FIG. 5, each terminal 13 is connected to an end portion 22a of a wiring 22 extending from the third electrode 19 to a portion below each terminal 13 along a direction vertical to the opposite direction D and thereby electrically connected to the third electrode 19. Each wiring 22 is integrally formed with the third electrode 19 by doping the impurities into the polysilicon layer 42a and decreasing resistance.

As illustrated in FIGS. 2 and 5, the third electrode 19 is electrically connected to the second electrode 18 via a pair of wirings 23. Each wiring 23 has a first wiring portion 24 and a second wiring portion 25. The first wiring portion 24 extends from the second electrode 18 to a portion below each terminal 13 to be the outside of the second electrode 18, along a direction vertical to the opposite direction D. Each first wiring portion 24 is integrally formed with the second electrode 18 by doping the impurities into the polysilicon layer 32b of the first laminate 30 and decreasing resistance. The second wiring portion 25 extends from an end portion 24a of each first wiring portion 24 to a portion below each terminal 13 to be the side of the third electrode 19, along the opposite direction D. Each second wiring portion 25 is disposed in the through-hole extending from the polysilicon layer 42a of the second laminate 40 to the polysilicon layer 32b of the first laminate 30 and is connected to each terminal 13 and the end portion 24a of each first wiring portion 24.

As illustrated in FIG. 2, a surface 30a of the first laminate 30 (that is, the surface of the polysilicon layer 32c of the first laminate 30) is provided with a trench 26 extending annularly to surround the second wiring portion 25 and a trench 27 extending annularly along an inner edge of the first electrode 17. A bottom surface of each of the trenches 26 and 27 reaches the silicon nitride layer 33a of the first laminate 30. The trench 26 electrically insulates the first electrode 17 and the second wiring portion 25 from each other. The trench 27 electrically insulates the first electrode 17 and an inner region of the first electrode 17 in the polysilicon layer 32c from each other. A region in each of the trenches 26 and 27 may be an insulating material and may be a gap. However, in this embodiment, the region in the trench 26 is silicon oxide and the region in the trench 27 is the gap. A width of each of the trenches 26 and 27 is about 0.5 to 50 µm. In addition, the trench 26 may be formed plurally (for example, doubly or triply) around the second wiring portion 25 and the trench 27 may be formed plurally (for example, doubly or triply) along an inner edge of the first electrode 17.

The surface 40a of the second laminate 40 (that is, the surface of the polysilicon layer 42c of the second laminate 40) is provided with a trench 28 extending annularly to surround the terminal 12. A bottom surface of the trench 28 reaches the sacrificial layer 16. The trench 28 electrically connects the terminal 12 and the third electrode 19. A region in the trench 28 may be an insulating material and may be a gap. However, in this embodiment, the region in the trench 28 is the gap. A width of the trench 28 is about 0.5 to 50 µm. In addition, the trench 28 may be formed plurally (for example, doubly or triply) around the terminal 12.

As illustrated in FIG. 2, a reflection prevention layer 51, a third laminate 52, an intermediate layer 53, and a fourth laminate 54 are laminated in this order on a surface 14b of a light emission side of the substrate 14. The reflection prevention layer 51 and the intermediate layer 53 respectively have the same configurations as the configurations of the reflection prevention layer 15 and the sacrificial layer 16. The third laminate 52 and the fourth laminate 54 respectively have lamination structures symmetrical to lamination structures of the first laminate 30 and the second laminate 40 on the basis of the substrate 14. A stress adjustment layer 50 is configured by the reflection prevention layer 51, the third laminate 52, the intermediate layer 53, and the fourth laminate 54. The stress adjustment layer 50 is disposed on the light emission side (other side) of the substrate 14 and has a function of suppressing a warp of the substrate 14. The stress adjustment layer 50 is provided with an opening 50a to include the light transmission region 11. A light shielding layer 29 is formed on a surface 50b of the light emission side of the stress adjustment layer 50. The light shielding layer 29 is made of aluminum, for example, and has a function of shielding measurement light.

In the Fabry-Perot interference filter 10A configured as described above, when a voltage is applied between the first electrode 17 and the third electrode 19 through the terminals 12 and 13, electrostatic force according to the voltage is generated between both the electrodes 17 and 19. As a result, the second mirror 41 is driven to be attracted to the side of the first mirror 31 fixed on the substrate 14 and the distance between the first mirror 31 and the second mirror 41 is adjusted. The wavelength of the light transmitting the Fabry-Perot interference filter 10A depends on the distance between the first mirror 31 and the second mirror 41 in the light transmission region 11. For this reason, the wavelength of the transmitting light can be appropriately selected by adjusting the voltage applied between the first electrode 17 and the third electrode 19. At this time, because the second electrode 18 has the same potential as the potential of the third electrode 19 electrically connected to the second electrode 18, the second electrode 18 functions as a compensation electrode to keep the first mirror 31 and the second mirror 41 flat in the light transmission region 11.

As described above, in the Fabry-Perot interference filter 10A, the first electrode 17 is formed in the polysilicon layer 32c of the first mirror 31 and the second electrode 18 is formed in the polysilicon layer 32b of the first mirror 31. As such, because the first electrode 17 and the second electrode 18 are not disposed on the same plane in the same mirror 31, the electric insulation between the first electrode 17 and the second electrode 18 is sufficiently secured. Therefore, according to the Fabry-Perot interference filter 10A, light having a predetermined wavelength can be transmitted appropriately.

In the Fabry-Perot interference filter 10A, because the second electrode 18 to be the compensation electrode is not positioned between the first electrode 17 and the third electrode 19, the electrostatic force according to the voltage can be generated appropriately between the first electrode 17 and the third electrode 19. In addition, because the distance between the first electrode 17 and the third electrode 19 can be shortened, a voltage necessary for generating the same electrostatic force can be decreased as compared with the case in which the distance is long.

In the Fabry-Perot interference filter 10A, because the first electrode 17 and the inner region of the first electrode 17 in the polysilicon layer 32c are electrically insulated by the trench 27, it is possible to cause the second electrode 18 to function as the compensation electrode more surely.

In the Fabry-Perot interference filter 10A, because the first electrode 17 and the second electrode 18 are not disposed on the same plane in the same mirror, laying of the wiring 23 to electrically connect the second electrode 18 and the third electrode 19 can be simplified. For example, in the related art in which the first electrode 17 and the second electrode 18 are disposed on the same plane in the same mirror, the wiring portion extending from the second electrode 18 to the opposite side of the third electrode 19 along the opposite direction D is necessary. However, the wiring portion is not necessary in the Fabry-Perot interference filter 10A. Leading of the electrode is simplified, so that a risk of defect occurrence at the time of manufacturing and failure occurrence at the time of use can be reduced.

In the Fabry-Perot interference filter 10A, the first mirror 31 is disposed on the light incidence side of the substrate 14 and the second mirror 41 is disposed on the light incidence side (one side) of the first mirror 31 with the gap S therebetween. That is, the first mirror 31 is fixed on the substrate 14 and the second mirror 41 is driven. Here, the two electrodes of the first electrode 17 and the second electrode 18 are formed in the first mirror 31 by doping the impurities. Meanwhile, only the third electrode 19 is formed in the second mirror 41 by doping the impurities. Generally, irregularity of the stress is easy to occur in a plane depending on execution or non-execution of impurity doping. For this reason, in the first mirror 31 in which complex impurity doping is executed, irregular stress is easy to occur, as compared with the second mirror 41. According to the Fabry-Perot interference filter 10A according to this embodiment, the first mirror 31 in which the irregular stress is easy to occur is fixed on the substrate 14 and the second mirror 41 in which the irregular stress is hard to occur is driven. For this reason, the possibility of driving of the second mirror 41 being affected by the irregular stress is low and the distance between the first mirror 31 and the second mirror 41 can be adjusted appropriately.

The Fabry-Perot interference filter 10A further includes the stress adjustment layer 50 that is disposed on the light emission side (other side) of the substrate 14 and suppresses the warp of the substrate 14. The stress adjustment layer 50 includes the reflection prevention layer 51, the third laminate 52, the intermediate layer 53, and the fourth laminate 54 and is a layer of which a layer configuration such as a thickness and a composition is substantially equal to a layer configuration of the reflection prevention layer 15, the first laminate 30, the sacrificial layer 16, and the second laminate 40 disposed on the light incidence side (one side) of the substrate 14. Thereby, the stress adjustment layer 50 can suppress the warp of the substrate 14 caused by mismatching of the layer configuration such as the thickness and the composition and can adjust the distance between the first mirror 31 and the second mirror 41 appropriately. The stress adjustment layer 50 is formed at the same time as when the layers disposed on the light incidence side (one side) of the substrate 14 are formed.

In the Fabry-Perot interference filter 10A, all of the first electrode 17, the second electrode 18, and the third electrode 19 are formed by doping the impurities into the polysilicon layer 32 forming a part of the first mirror 31 or the polysilicon layer 42 forming a part of the second mirror 41. Because an optical property of the polysilicon layer is rarely affected by execution or non-execution of doping of the impurities, the first mirror 31 and the second mirror 41 can have the functions of the electrodes while maintaining the functions as the mirrors.

In the Fabry-Perot interference filter 10A, each of the polysilicon layers 32 and 42 (particularly, the polysilicon layer 42 configuring the second laminate 40) is a layer of the amorphous silicon polycrystallized by the annealing. In addition, stress of the silicon nitride layer 43 of the second laminate 40 is preferably weakened (tensile stress is weakened). Particularly, the second mirror 41 driven by the voltage preferably has weak tensile stress. According to this configuration, it is possible to easily adjust the stress occurring in the second mirror 41 at the time of manufacturing and it is possible to suppress the second mirror 41 from being damaged by driving.

[Method of Manufacturing Fabry-Perot Interference Filter]

Next, an example of method of manufacturing the Fabry-Perot interference filter 10A will be described. First, the reflection prevention layer 15 is formed on the surface 14a of the substrate 14 and the reflection prevention layer 51 is formed on the surface 14b of the substrate 14. Next, the polysilicon layer 32a, the silicon nitride layer 33a, and the polysilicon layer 32b forming a part of the first laminate 30 are laminated in this order on the reflection prevention layer 15. At the same time, a part of the third laminate 52 is formed on the reflection prevention layer 51 in the same way. Next, the resistance of a part of the formed polysilicon layer 32b is decreased by doping the impurities and the second electrode 18 and the first wiring portion 24 of each wiring 23 are formed, as illustrated in FIGS. 2 and 4.

Next, the silicon nitride layer 33b forming a part of the first laminate 30 is formed on the polysilicon layer 32b. At the same time, a part of the third laminate 52 is formed on the light emission side of the substrate 14 in the same way. A portion of the formed silicon nitride layer 33b corresponding to the second wiring portion 25 of each wiring 23 is etched and the polysilicon layer 32b below the silicon nitride layer is exposed. Next, the polysilicon layer 32c forming the remaining portion of the first laminate 30 is formed on the silicon nitride layer 33b and the first laminate 30 is formed. At the same time, the third laminate 52 is formed on the light emission side of the substrate 14 in the same way. Next, resistance of a part of the formed polysilicon layer 32c is decreased by doping the impurities. As illustrated in FIGS. 2 and 3, the first electrode 17, each wiring 21, and the second wiring portion 25 of each wiring 23 are formed and the trenches 26 and 27 are formed by etching.

Next, the sacrificial layer 16 is formed on the first laminate 30 and the intermediate layer 53 is formed on the third laminate 52. Next, a portion of the formed sacrificial layer 16 corresponding to the second wiring portion 25 of each wiring 23 is etched and the polysilicon layer 32c below the sacrificial layer is exposed. Next, the polysilicon layer 42a forming a part of the second laminate 40 is formed on the sacrificial layer 16. At the same time, a part of the fourth laminate 54 is formed on the light emission side of the substrate 14 in the same way. Next, the resistance of a part of the formed polysilicon layer 42a is decreased by doping the impurities. As illustrated in FIGS. 2 and 5, the third electrode 19 and each wiring 22 are formed. Next, the silicon nitride layer 43a, the polysilicon layer 42b, the silicon nitride layer 43b, and the polysilicon layer 42c forming the remaining portion of the second laminate 40 are sequentially laminated on the polysilicon layer 42a and the second laminate 40 is formed. At the same time, the fourth laminate 54 is formed on the light emission side of the substrate 14 in the same way. The stress adjustment layer 50 is configured by the reflection prevention layer 51, the third laminate 52, the intermediate layer 53, and the fourth laminate 54, on the light emission side of the substrate 14.

Next, the through-holes extending from the surface 40a of the second laminate 40 (that is, the surface of the polysilicon layer 42c of the second laminate 40) to the polysilicon layer 32c of the first laminate 30 are formed by etching the second laminate 40 partially and the end portion 21a of each wiring 21 is exposed. Likewise, the through-holes extending from the surface 40a of the second laminate 40 to the polysilicon layer 42a of the second laminate 40 are formed by etching the second laminate 40 partially and the end portion 22a of each wiring 22 is exposed. In addition, a conductive layer made of aluminum is formed in the through-holes and the terminals 12 and 13 are formed.

Next, the plurality of through-holes 40b extending from the surface 40a of the second laminate to the sacrificial layer 16 are formed in a portion corresponding to the gap S in the second laminate 40. In addition, the trench 28 is formed at the same time as forming the through-holes 40b. Next, the light shielding layer 29 is formed on the surface 50b of the light emission side of the stress adjustment layer 50, a portion of the stress adjustment layer 50 corresponding to the light transmission region 11 is removed by etching, and the opening 50a is formed. The reflection prevention layer 51 may be left on the bottom surface of the opening 50a, that is, the surface 14b of the light emission side of the substrate 14, the reflection prevention layer 51 may be removed from the bottom surface of the opening 50a, and a separate layer may be formed after the opening 50a is formed and may be used as the reflection prevention layer 51. After the opening 50a is formed, in a state in which the reflection prevention layer 51 is left on the surface 14b of the light emission side of the substrate 14, a protection film (for example, aluminum oxide) having resistance against hydrofluoric acid gas and rarely exerting optical influence may be formed. Next, the sacrificial layer 16 is removed by performing vapor-phase etching using the hydrofluoric acid gas via the through-holes 40b. Next, a chip is formed by dicing. If stealth dicing is used, the second mirror 41 having a membrane shape is hard to be damaged. Therefore, the stealth dicing is preferably used.

Each layer is formed by thermal oxidization, TEOS-CVD, or decompression CVD. Also, each layer can be formed by plasma CVD, sputtering, deposition, and ion plating. Formation of each layer is performed simultaneously on both surfaces of the substrate 14, so that a stress balance is maintained, and the warp of the substrate 14 and the damage of the second mirror 41 are hard to occur. However, film formation of the light emission side of the substrate 14 is not essential and the configuration of only the light incidence side may be realized in the case of low-temperature film formation and film formation by stress adjustment. Each polysilicon layer (particularly, the polysilicon layer 42 configuring the second laminate 40) is formed by polycrystallizing the amorphous silicon by the annealing. In addition, the stress of the silicon nitride layer 43 of the second mirror is preferably weakened (the tensile stress is weakened).

In the Fabry-Perot interference filter 10A, the gap S between the first mirror 31 and the second mirror 41 is formed by performing the vapor-phase etching on the sacrificial layer 16 made of the silicon oxide using the hydrofluoric acid gas via the through-holes 40b. However, the first mirror 31 and the second mirror 41 are configured by the polysilicon layers 32 and 42 and the silicon nitride layers 33 and 43, the first mirror 31 and the second mirror 41 are not etched simultaneously by etching the sacrificial layer 16, and degradation does not occur. For this reason, degradation prevention measures of the first mirror 31 and the second mirror 41 are unnecessary and production is easy.

Second Embodiment

Figure 6:
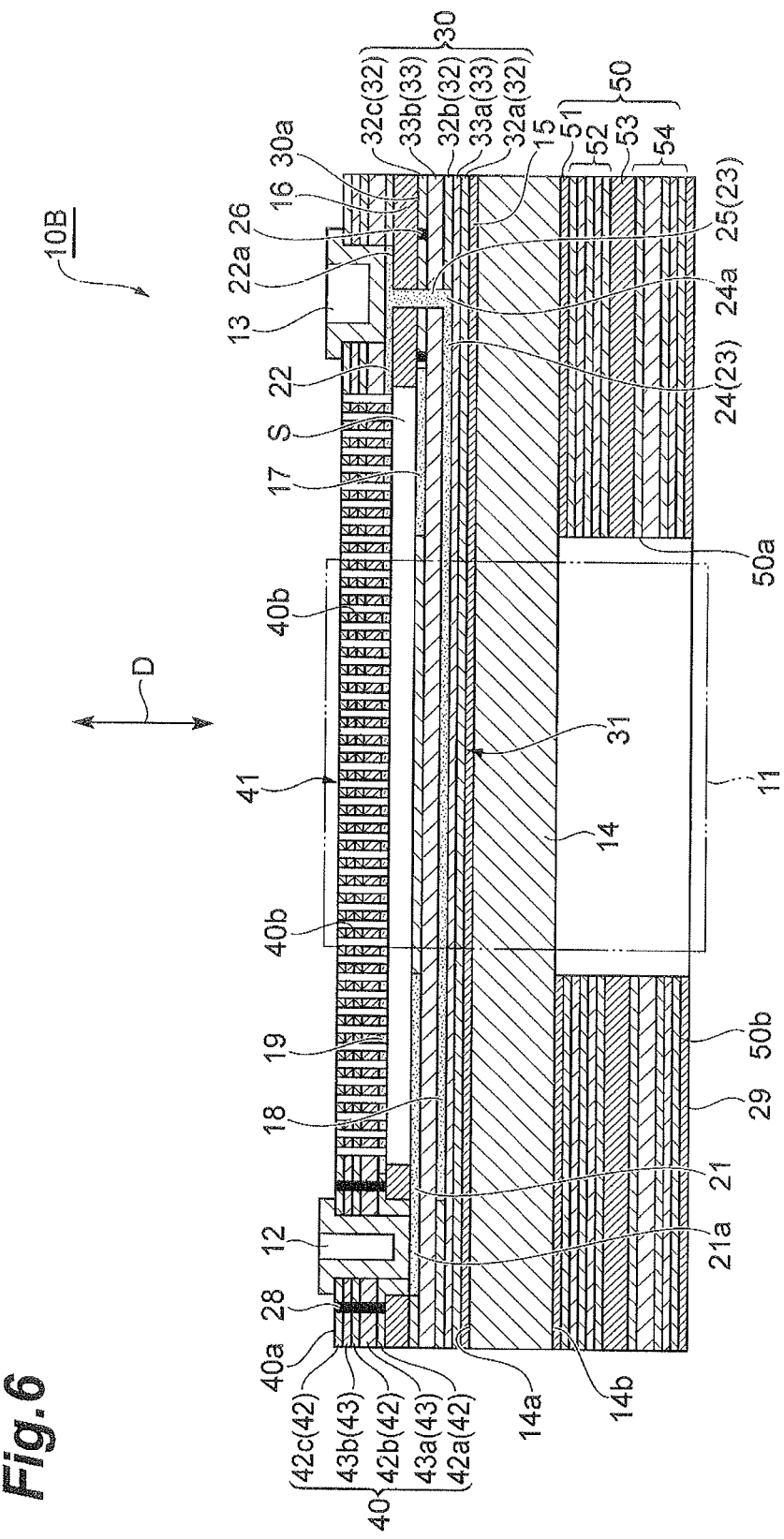
FIG. 6 is a cross-sectional view of a Fabry-Perot interference filter according to a second embodiment of the present invention.

As illustrated in FIG. 6, a Fabry-Perot interference filter 10B is different from the Fabry-Perot interference filter 10A mainly in that a trench 27 is not formed. The trench 27 is not formed, so that a first electrode 17 and an inner region of the first electrode 17 in a polysilicon layer 32c are electrically connected to each other. As a result, a potential difference is generated between the inner region of the first electrode 17 in the polysilicon layer 32c, and a third electrode 19, and electrostatic force is generated. Therefore, it is possible to decrease a voltage applied between the first electrode 17 and the third electrode 19 to adjust a distance between a first mirror 31 and a second mirror 41.

Meanwhile, the fact that silicon nitride and hydrofluoric acid gas react with each other and a residue occurs is known (B. DU BOIS, HF ETCHING OF SI-OXIDES AND SI-NITRIDES FOR SURFACE MICROMACHINING, Sensor Technology 2001, Proceedings of the Sensor Technology Conference 2001, held in Enschede, The Netherlands, 14-15 May 2001, pp 131-136). According to the Fabry-Perot interference filter 10B, when a sacrificial layer 16 is etched using the hydrofluoric acid gas, there is no exposure portion of a silicon nitride layer in the first mirror 31. For this reason, it is possible to suppress occurrence of the residue that interferes with driving of the second mirror 41 and obstructs the driving.

Third Embodiment

Figure 7:
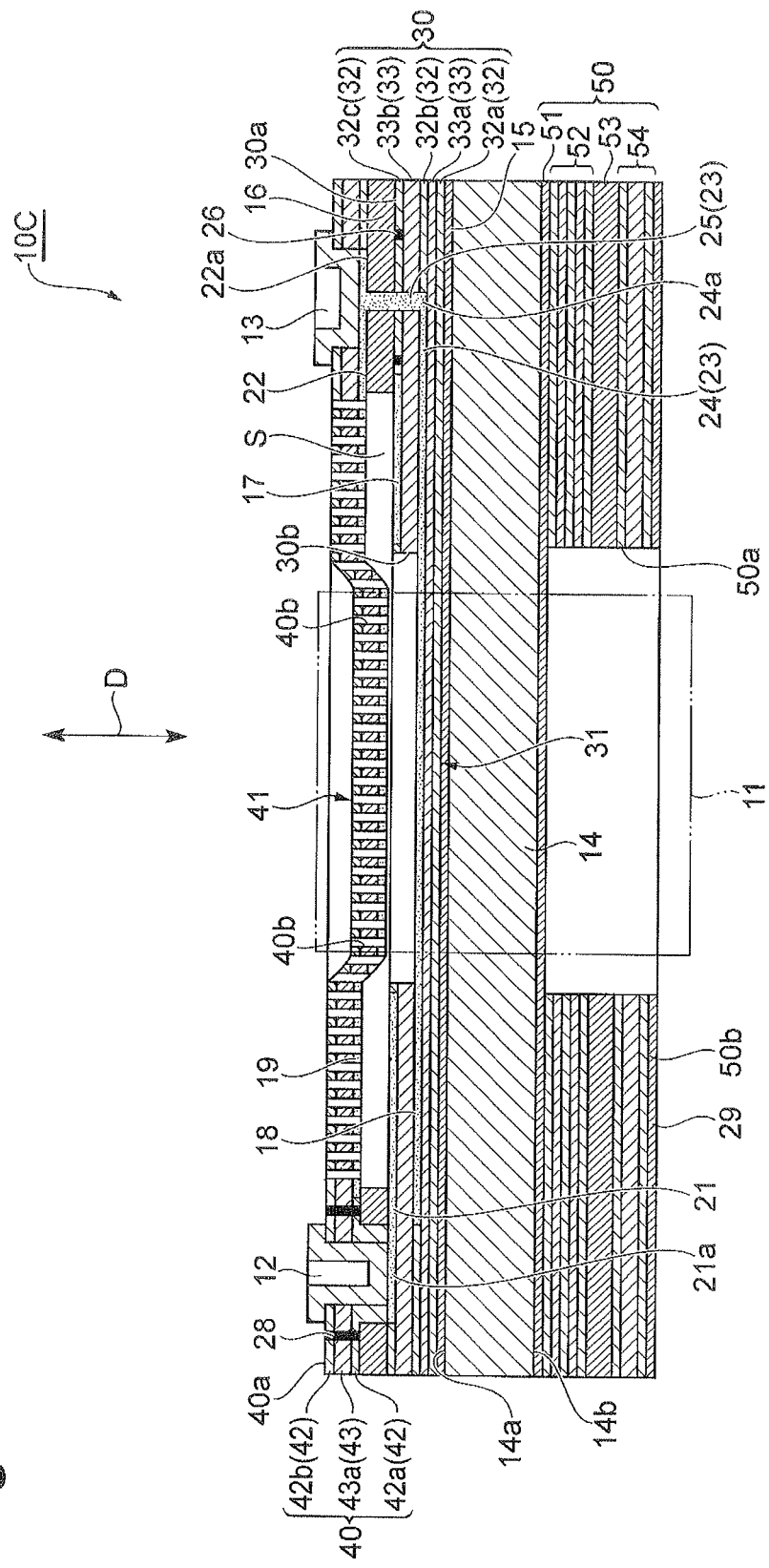
FIG. 7 is a cross-sectional view of a Fabry-Perot interference filter according to a third embodiment of the present invention.

As illustrated in FIG. 7, a Fabry-Perot interference filter 10C is different from the Fabry-Perot interference filter 10A mainly in that an opening 30b is provided in a polysilicon layer 32c and a silicon nitride layer 33b of a first laminate 30. The opening 30b is provided to include a light transmission region 11 and can be formed by etching, for example. A second electrode 18 is exposed to a gap in the opening 30b (recessed portion) provided in a first mirror 31. In a state in which a voltage is not applied, a distance between the first mirror 31 and a second mirror 41 in an opposite direction D is constant and in a region corresponding to the opening 30b, the second mirror 41 has a shape in which the second mirror is concave toward the side of the first mirror 31 by a sum of a thickness of the polysilicon layer 32c and a thickness of the silicon nitride layer 33b.

In the Fabry-Perot interference filter 10C, because the first mirror 31 is not provided with two layers of the polysilicon layer 32c and the silicon nitride layer 33b and thereby includes three layers of a polysilicon layer 32a, a silicon nitride layer 33a, and a polysilicon layer 32b, the second mirror 41 also has a configuration of three layers corresponding to the configuration of the first mirror. As such, if the number of layers in the second mirror 41 decreases, a spring constant decreases, so that driving of the second mirror 41 becomes easy, and a voltage necessary for the driving can be decreased.

In the Fabry-Perot interference filter 10C, when a sacrificial layer 16 is etched, a residue may occur from a portion exposed to the opening 30b of the silicon nitride layer 33b. However, because the exposure portion has only a thickness of the silicon nitride layer 33b, occurrence of the residue can be suppressed as compared with the Fabry-Perot interference filter 10A according to the first embodiment.

The preferred embodiments of the present invention have been described. However, the present invention is not limited to the embodiments. For example, the second electrode 18 may be positioned at the side of the third electrode 19 with respect to the first electrode 17 in an opposite direction D where the first mirror 31 and the second mirror 41 are opposite each other. In addition, the second mirror 41 may be disposed on one side of the substrate 14 and the first mirror 31 may be disposed on one side of the second mirror 41 with a gap S therebetween. In addition, when the opening 30b (recessed portion) is provided in the first mirror 31, an insulating layer may be formed in the opening 30b and the second electrode 18 may be isolated from the gap S by the insulating layer. In addition, the material, the shape, and the dimension are only examples, and, for example, a material of the substrate included in the Fabry-Perot interference filter may be a material having a light transmitting property with respect to the measurement light.

In addition, the layer number of the polysilicon layer 32 and the silicon nitride layer 33 configuring the first laminate 30 and the layer number of the polysilicon layer 42 and the silicon nitride layer 43 configuring the second laminate 40 are not limited to the layer numbers described in the embodiments and can be appropriately changed according to resolution and an application range of the wavelength of the light transmitted by the Fabry-Perot interference filter.

As illustrated in FIGS. 2, 6, and 7, in the embodiments, the light transmission region 11 is narrower than the opening 50a, but the present invention is not limited to such a form. For example, when light having a width larger than a width of the opening 50a is introduced as incidence light, the opening 50a may define the light transmission region 11.

INDUSTRIAL APPLICABILITY

According to the present invention, a Fabry-Perot interference filter capable of appropriately transmitting light having a desired wavelength can be provided.

REFERENCE SIGNS LIST 10A, 10B, 10C: Fabry-Perot interference filter, 11: light transmission region, 16: sacrificial layer, 17: first electrode, 18: second electrode, 19: third electrode, 23: wiring, 24: first wiring portion, 25: second wiring portion, 30: first laminate, 31: first mirror, 32, 32a, 32b, 32c, 42, 42a, 42b, 42c: polysilicon layer, 33, 33a, 33b, 43, 43a, 43b: silicon nitride layer, 40: second laminate, 41: second mirror, 50: stress adjustment layer, S: gap

The invention claimed is:

1. A Fabry-Perot interference filter comprising:
a first mirror;
a second mirror being opposite to the first mirror with a gap therebetween;
a first electrode formed in the first mirror to surround a light transmission region;
a second electrode formed in the first mirror to include the light transmission region; and
a third electrode formed in the second mirror to be opposite to the first electrode and the second electrode and connected to the same potential as the second electrode,
the second electrode is positioned at the opposite side of the third electrode with respect to the first electrode in an opposite direction where the first mirror and the second mirror are opposite each other, and
the second electrode being a compensation electrode.

2. The Fabry-Perot interference filter according to claim 1, wherein the second electrode is isolated from the gap by a dielectric layer configuring the first mirror.

3. The Fabry-Perot interference filter according to claim 1, wherein the second electrode is exposed to the gap in a recessed portion provided in the first mirror.

4. The Fabry-Perot interference filter according to claim 1, further comprising:
a wiring electrically connecting the second electrode and the third electrode,
wherein the wiring has a first wiring portion extending from the second electrode to the outside of the second electrode along a direction perpendicular to the opposite direction and a second wiring portion extending from the first wiring portion to the side of the third electrode along the opposite direction.

5. The Fabry-Perot interference filter according to claim 1, further comprising:
a substrate supporting the first mirror and the second mirror,
wherein the first mirror is disposed on one side of the substrate, and
the second mirror is disposed on the one side of the first mirror with the gap therebetween.

6. The Fabry-Perot interference filter according to claim 1,
wherein each of the first mirror and the second mirror has a polysilicon layer and a silicon nitride layer, and
the first electrode, the second electrode, and the third electrode are doped regions of impurities in the polysilicon layer.

7. The Fabry-Perot interference filter according to claim 6, wherein the polysilicon layer is a layer of amorphous silicon polycrystallized by annealing.

* * * * *